(12) United States Patent
Tailliet

(10) Patent No.: US 7,239,192 B2
(45) Date of Patent: Jul. 3, 2007

(54) SELF-REPARABLE DEVICE TO GENERATE A HIGH VOLTAGE, AND METHOD FOR REPAIRING A DEVICE TO GENERATE A HIGH VOLTAGE

(75) Inventor: François Tailliet, Fuveau (FR)

(73) Assignee: STMicroelectronics SA, Montrogue (FR)

( * ) Notice: Subject to any disclaimer, the term of this patent is extended or adjusted under 35 U.S.C. 154(b) by 527 days.

(21) Appl. No.: 10/911,409

(22) Filed: Aug. 4, 2004

(65) Prior Publication Data
US 2005/0030683 A1     Feb. 10, 2005

(30) Foreign Application Priority Data
Aug. 6, 2003 (FR) .................................. 03 09680

(51) Int. Cl.
*G05F 1/10* (2006.01)
(52) U.S. Cl. .................................................. 327/536
(58) Field of Classification Search ................ 327/535, 327/536, 537
See application file for complete search history.

(56) References Cited

U.S. PATENT DOCUMENTS 5,767,735 A * 6/1998 Javanifard et al. .......... 327/536
5,909,141 A * 6/1999 Tomishima ................. 327/536
6,208,198 B1 * 3/2001 Lee ............................ 327/536
2002/0021150 A1 2/2002 Tuchiya et al. ............. 327/108

FOREIGN PATENT DOCUMENTS

FR        2782421        2/2000

* cited by examiner

*Primary Examiner*—Jeffrey Zweizig
(74) *Attorney, Agent, or Firm*—Lisa K. Jorgenson; Allen, Dyer, Doppelt, Milbrath & Gilchrist, P.A.

(57) ABSTRACT

A generator produces a high voltage from a power supply voltage. The generator includes an oscillator for producing a driving signal, and a charge pump for producing the high voltage from the power supply voltage based upon receiving the driving signal. The charge pump includes n series-connected voltage step-up stages including a first step-up stage receiving the power supply voltage and a last step-up stage producing the high voltage, at least one replacement step-up stage, and a switching circuit. The switching circuit replaces a damaged one of the n series-connected voltage step-up stages with the at least one replacement stage when a warning signal is received. A voltage regulator produces an activation signal for activating the oscillator if the high voltage is below a desired value. A detector produces the warning signal if the charge pump is defective.

21 Claims, 6 Drawing Sheets

SELF-REPARABLE DEVICE TO GENERATE A HIGH VOLTAGE, AND METHOD FOR REPAIRING A DEVICE TO GENERATE A HIGH VOLTAGE

FIELD OF THE INVENTION

The present invention relates to voltage generators, and more particularly, to a high-voltage generator using a Schenkel multiplier, better known as a charge pump. The invention may be applied in any field requiring the use of high voltages, such as in the field of integrated circuits. Thus, the invention may be applied to electrically programmable non-volatile memories, such as EEPROMs or Flash EEPROMS, for example.

BACKGROUND OF THE INVENTION

Electrically programmable non-volatile memories, such as EEPROMs or Flash EEPROMs use a high voltage for their programming or erasure. This high voltage is generally between 10 and 20 Volts. In an integrated circuit, a high voltage of this kind is generally obtained from the logic supply voltage VCC of the integrated circuit through a high-voltage generator comprising a charge pump. The generator usually has a regulator to regulate the HV output level of the charge pump to obtain a determined nominal level HV0 as a function of the application envisaged.

A prior art high-voltage generator 100 is shown in FIG. 1. It has an oscillator 10 which, when activated by an enabling signal OK, provides two clock signals F and /F in phase opposition. The clock signals F and /F are used by a charge pump 20 for outputting a high voltage HV. The high voltage HV is applied to a load 40 for programming or erasing a non-volatile memory, for example.

The high voltage HV is also applied to a regulation circuit or regulator 30 that outputs a signal REG. The signal REG is active if the voltage HV is below a predefined level HV0. In the illustrated example of FIG. 1, the signal REG is equal to a logic 1. Otherwise, the signal REG is inactive. The output of the regulator 30 is looped back to the enabling input of the oscillator through an AND logic gate 50. The AND logic gate 50 receives the signal REG and the signal RUN to start the high-voltage generator 100, and produces the signal OK.

The general operation of the generator 100 is explained below with reference to FIG. 2, which shows the progress in time of the signals RUN, F, /F, HV and REG. The generator 100 is activated by the signal RUN. During an initial starting phase, the signal REG is active because the voltage HV is initially zero, and places the oscillator 10 into operation. The oscillator 10 then produces the signals F, /F for driving the charge pump 20. The voltage HV at the output of the pump 20 increases until it reaches the value HV0. This build-up, which is relatively slow, corresponds to a phase for the charging of the capacitors of the different stages of the pump 20. This charging is achieved by successive transfers of charges from one stage of the pump to the next stage.

When the voltage HV reaches the level HV0, the regulator 30 deactivates the signal REG by setting it at an inactive value. In this case a logic 0. The inactive signal REG stops the oscillator 10. Since the signals F, /F are no longer given by the oscillator 10, the pump 20 also stops. The output voltage HV will then decrease with varying speed depending on the current consumption of the load 40 that uses the voltage HV and/or depending on current leakages, if any.

When the voltage returns below HV0, the regulator reactivates the signal REG, the oscillator 10 and the pump 20 start up again, and the voltage HV increases again.

Thus, after the pump-starting phase, a phase of stable operation begins. During the stable phase, the oscillator 10 will start again and then stop periodically to sustain the level HV0 of the voltage HV at output of the charge pump 20. The oscillator 10 is activated more frequently as the current put through by the load 40 is increased. During stable operation, the voltage HV has a saw-toothed shape due to hysteresis. The oscillator 10 starts or stops for a certain period of time after HV passes below or above HV0, i.e., for the time necessary for the regulator 30 to detect the value of HV and produce the signal REG. Thus, the maximum value of HV is slightly above HV0 and the critical value of HV is slightly below HV0.

FIGS. 3a to 3d show the progress in time of the voltage HV for different values of supply voltage VCC and for different load values. FIG. 3a corresponds to a high-voltage generator that is powered by a low voltage VCC (about 2 to 3V) and provides a low current to the load 40. The current may be tens of microamperes or less. FIG. 3b corresponds to a high-voltage generator powered by a low voltage VCC and provides substantial current in the range of some milliamperes to the load. FIG. 3c corresponds to a generator powered by a high-voltage VCC (about 4 to 5V) and provides a low current to the load. Finally, FIG. 3d corresponds to a generator powered by a high-voltage VCC and provides a substantial current to the load. The signal REG reacts as a function of the variations in the voltages HV.

It can thus be seen in FIGS. 3a to 3d that the higher the voltage VCC, the sharper are the slopes of the HV build-up phases, and the shorter is the duration of the build-up (signal REG is active). Inversely, the higher the current consumed, the sharper are the slopes of the HV descending phases and the shorter is the duration of the descending phases (signal REG is inactive).

In the example, the charge pump 20 is a Schenkel multiplier. It is formed conventionally by n+1 identical diodes D1 to Dn+1 connected in series. The power supply voltage VCC is applied to the anode of the first diode D1, and the last diode Dn+1 provides the high voltage HV at output on its cathode. The pump 20 also has a capacitor Cout connected between the output of the last diode Dn+1 and ground of the circuit. The pump 20 finally comprises n identical capacitors C1 to Cn controlled by the signals F or /F. Each capacitor C1 to Cn has a first terminal connected between two successive diodes, and a second terminal to which the signal F or the signal /F is applied.

In the example of FIG. 1, the signal F is applied to the second terminal of the odd-ranking capacitors C1, C3, ..., Cn and the signal /F is applied to the second terminal of the even-ranking capacitors C2, ..., Cn−1. The association of a diode Di with a capacitor Ci forms a stage Ei of the pump. The pump 20 is thus formed by n stages E1 to En, and each stage Ei raises the voltage that it receives at the input (namely the input of the diode Di) by VCC−VDD. VDD is the threshold of the diodes D1 to Dn+1.

Thus, a charge pump with n stages is equivalent to a Thevenin generator whose theoretical characteristics are $HV=(n+1) \cdot (VCC-VDD)$ and $R=n/(C0 \cdot f)$, where C0 is the capacitance of the capacitors C1 to Cn and f is the frequency of the oscillator 10. The number n of stages of the pump 20 is chosen as a function of the power supply voltage VCC and the desired high voltage HV. In theory, it would be possible to choose n=5 to obtain a voltage HV of 18 V from a voltage VCC of 3 V. However, it is preferred that n is in the range of 10 to compensate for the ohmic losses of the equivalent Thevenin generator, and actually obtain a voltage HV of 18 V.

The oscillator 10 is not described in detail. It is made according to a known scheme for this type of application. The regulator 30 comprises a stack of Zener type p diodes (three diodes Z1 to Z3 are shown) that are series-connected. The cathode of the first diode Z1 is connected to the output of the charge pump 20 to receive the high voltage HV, and the anode of the last diode Z3 is connected to the drain (point A) of an N-type transistor T1 whose source is connected to ground of the circuit. In the example, the p diodes are identical and have a conduction threshold VZ of about 5.3V.

The regulator 30 also has a P-type transistor T2. The voltage VCC is applied to the source of this transistor T2 and its drain is connected to the drain of an N-type transistor T3 whose source is grounded. A voltage VREFN is applied to the gate of the transistor T1 and the voltage VREFP is applied to the gate of the transistor T2. VREFN and VREFP are chosen so that T1, T2 are always on and are in a saturation mode. T1, T2 are thus equivalent to current sources.

The gate of T3 is connected to the drain of T1 (point A). Finally, the common drain of the transistors T2, T3 (point B) is connected to the output of the regulated by two inverters I1, I2 that are series-connected. The two inverters I1, I2 simply have the function of converting the analog signal at the point B into a logic signal REG, produced at output of the regulator.

If the Zener diodes are identical, the level at which the regulator switches over is fixed by the relationship $HV0=p.VZ+VTN$, with p being the number of Zener diodes used, VZ being the conduction threshold of the Zener diodes and VTN being the threshold of the transistor T1. The number of diodes and the value of their threshold are chosen as a function of the value desired for HV0. For example, in using three Zener diodes with a threshold of about 5.3V and a transistor T1 having a threshold of about 1V, the switch-over threshold HV0 of the regulator 30 is about 17V.

The regulator 30 works as follows. If the voltage HV applied to the diode Z1 is below HV0, the current IA flowing in the diodes and the transistor T1 pulls the point A to 0 volts and the transistor T3 is therefore off. Since T2 is on, the current IB flowing in T2 draws the point B to VCC and the signal REG is equal to a logic one. Inversely, if the voltage HV is higher than HV0, the current IA draws the point A to a level sufficient to turn the transistor T3 on, the current IB flowing in T2, T3 draws the point B to ground and the signal REG is equal to a logic zero.

The capacitors of the charge pump are subjected to high voltages, especially the capacitors of the last stages of the pump closest to the output. To make them, the transistors used are sometimes transistors having high-voltage gate oxides that are thicker, conventionally having a thickness of 25 to 40 nm and capable of withstanding voltages in the range of 25 to 40V. However, these values are approximate, and statistically, the oxide may break down for voltages far below 25V. It is thus noted that several tens of ppm (ppm) of the capacitors specified for a rated voltage of 25V break down for voltages in the range of 10 to 15V.

One approach to this problem is to further increase the thickness of the oxides used to make the capacitors. However, this approach is not satisfactory. Indeed, the breakdown strength of a thicker oxide is not proportional to its thickness. Furthermore, increasing the thickness of the oxide assumes making a corresponding increase in the surface area of the capacitors to preserve a same capacitance value. Finally, thickening the oxides leads to an increase in the voltage thresholds of the high-voltage transistors used, to the point of making them unusable in the desired voltage field.

SUMMARY OF THE INVENTION

It is an object of the invention to address the problems associated with the breakdown the prior art charge pumps.

This object is achieved with a self-repairable high-voltage generator comprising means or circuits to detect and then replace a defective stage of the charge pump. A generator according to the invention is thus characterized in that it also comprises a detector to produce a warning signal when it detects a defective state of the charge pump. The charge pump also comprises at least one replacement stage, and means or a switching circuit to replace the damaged stage (En) by a replacement stage when it receives the warning signal.

The repairing, i.e., the replacement of the damaged stage, may be done during operation of the pump. It is therefore transparent to the user. After repair, the pump again works normally.

According to a first embodiment, the detector may carry out a time-based detection and produce a warning signal when the activation signal is kept active by the regulator for a period of time greater than a predefined time. To this end, the detector may comprise a first charge accumulator to receive a charging current, a comparator to produce the warning signal when the potential at the terminals of the first accumulator reaches a predefined value, and means to short-circuit the first accumulator when the activation signal is inactive.

The charging current is preferably independent of the power supply voltage. Preferably also, the detector comprises means to prolong the duration of the predefined time during a pump-starting phase. The unnecessary replacement of an undamaged stage of the pump is thus avoided. By way of example, it is possible to use a capacitor as a charge accumulator.

According to a second embodiment, the detector may carry out a detection of the level of the high voltage, and produce the warning signal when the high voltage falls below a critical value. To this end, the detector preferably comprises a voltage level detector to produce the warning signal when the high voltage is below the critical value, and means to inhibit the voltage level detector during the first activation of the activation signal.

The invention also relates to a method for repairing a high-voltage generator producing a high voltage from a power supply voltage, wherein the generator comprises an oscillator to produce a driving signal, and a charge pump to produce the high voltage from the power supply voltage (VCC) and as a function of the driving signal. The charge pump may comprise n series-connected voltage step-up stages. The first stage may receive the power supply voltage, and the last stage may produce the high voltage. A voltage regulator may produce a signal for the activation of the oscillator that is active if the high voltage is below a desired value.

The method according to the invention may comprise monitoring the state of the pump, and if a defective state of the pump is detected, at least one stage of the pump is replaced by an equivalent number of replacement stages. The replacement step preferably comprises disconnection of the damaged stage, and connection of a replacement stage.

The replacement step may advantageously be complemented by a step for the storage of information indicating that the pump has been repaired.

According to a first mode of implementation of the method, the replacement step may comprise the replacement of the last stage of the charge pump. According to a second mode of implementation of the method, the replacement step may comprise the simultaneous replacement of x last stages of the charge pump. According to a third embodiment of the method, after a stage of the pump has been replaced, the state of the pump is monitored again, and a stage ranked immediately below the previously replaced stage is replaced if the defective state of the pump is again detected.

BRIEF DESCRIPTION OF THE DRAWINGS

Other features and advantages of the invention shall be described in detail in the following description, given by way of an indication that in no way restricts the scope of the invention, of an embodiment of a high-voltage generator according to the invention. The description is to read with reference to the appended drawings, of which.

DETAILED DESCRIPTION OF THE PREFERRED EMBODIMENTS

The elements common to several figures bear the same references. For a clearer understanding of the invention, it would be appropriate to return first to the operation of the charge pump of the high-voltage generator. In normal operation, the oscillator and the charge pump of a high-voltage generator are deactivated and then reactivated at regular intervals to compensate for reductions in the voltage HV as and when the load consumes current. This gives rise to a saw-toothed high voltage HV.

Figure 3A:
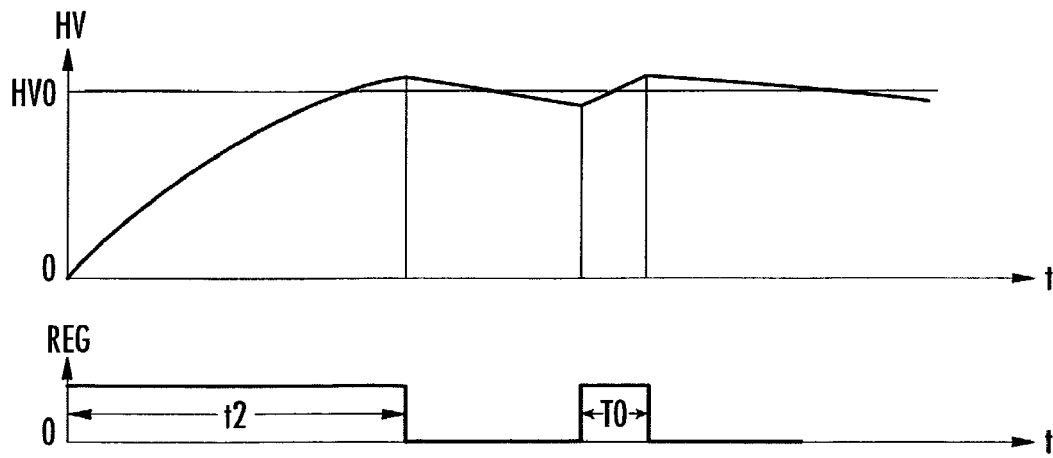
FIGS. 3a to 3d are timing diagrams of the progress of different characteristic signals of the generator shown in FIG. 1 for different values of the power supply voltage VCC and the current consumed by the load.
Figure 3B:
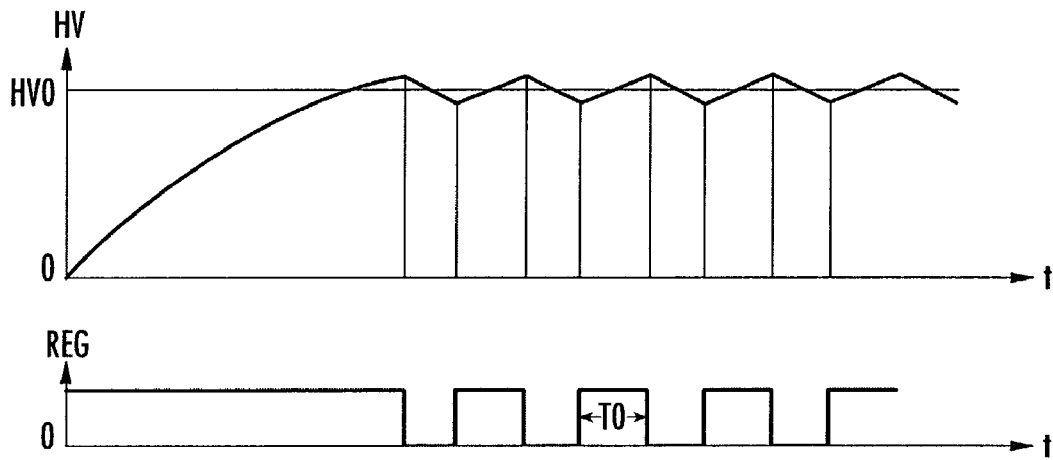
Figure 3C:
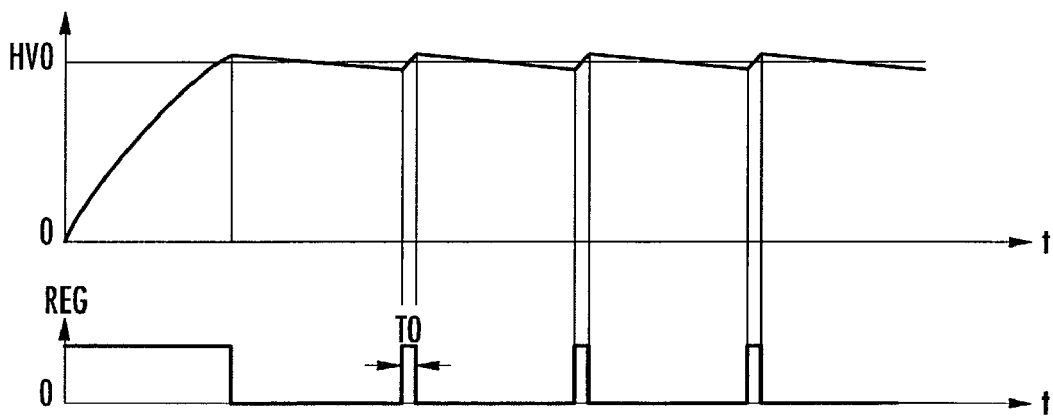
Figure 3D:
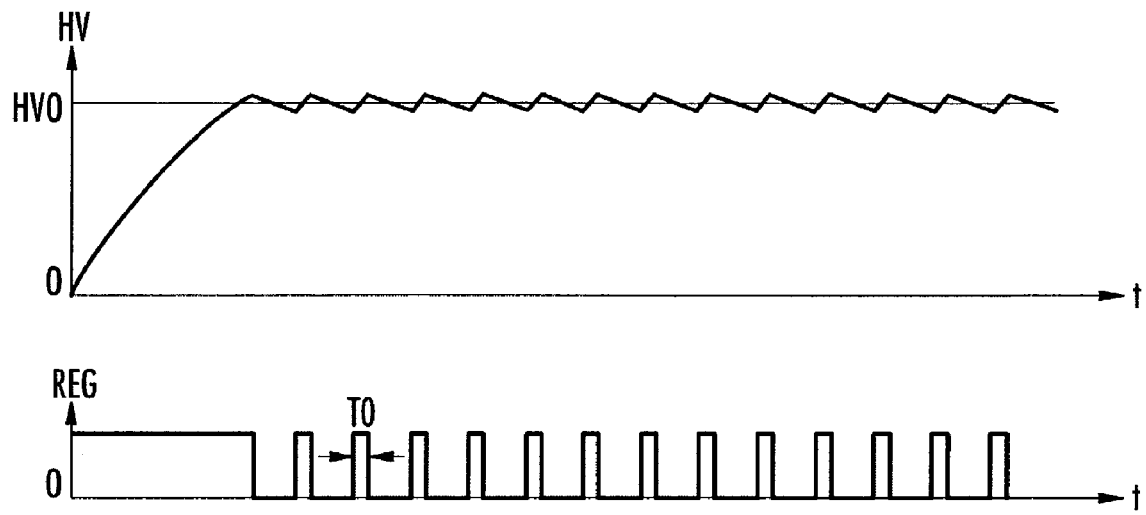
Figure 3E:
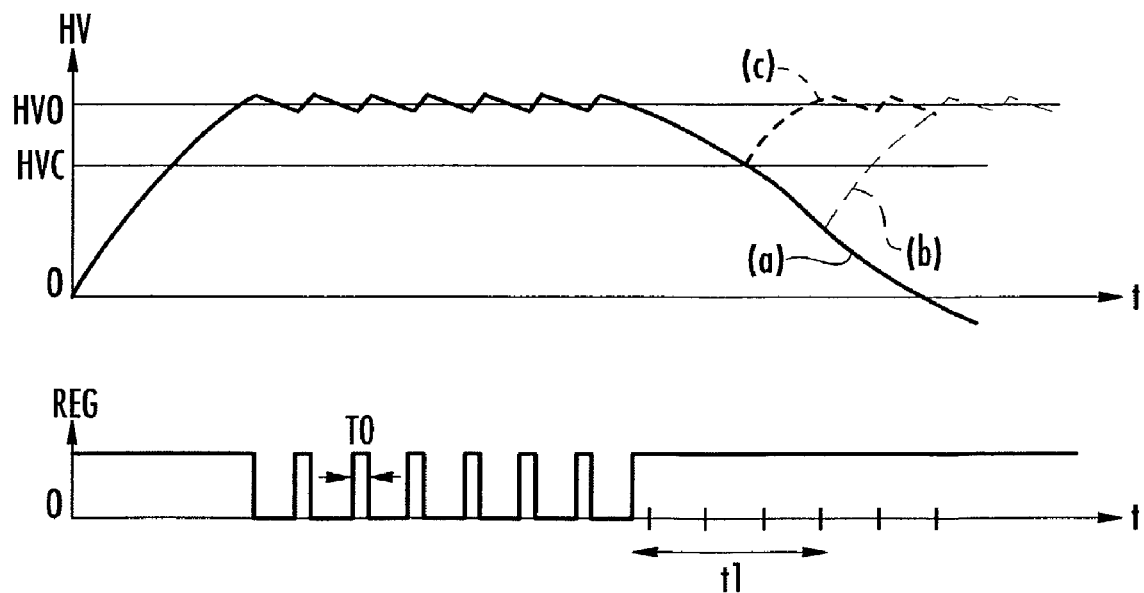
FIG. 3e is a timing diagram of the progress of selected characteristic signals of the generator according to the present invention.

When a capacitor of a stage of a charge pump breaks down, the transfer of charges between the damaged stage and the next stage or the output of the pump no longer takes place. The pump can therefore no longer increase the level of the voltage HV that it produces, even though the signal REG and the oscillator are kept continuously active by the regulator. Since the load continues to consume current at output, the voltage HV drops significantly. This is what is shown in FIG. 3e, curve (a).

The stages closest to the output of the pump are those that break down most frequently, because they are subjected to the highest voltages. Thus, when a charge pump is damaged, the last stage En breaks down in 80 to 90% of the cases, the second last stage En-1 breaks down in 5 to 10% of the cases, and one of the stages E1 to En-2 breaks down in only 5 to 10% of the cases.

Figure 1:
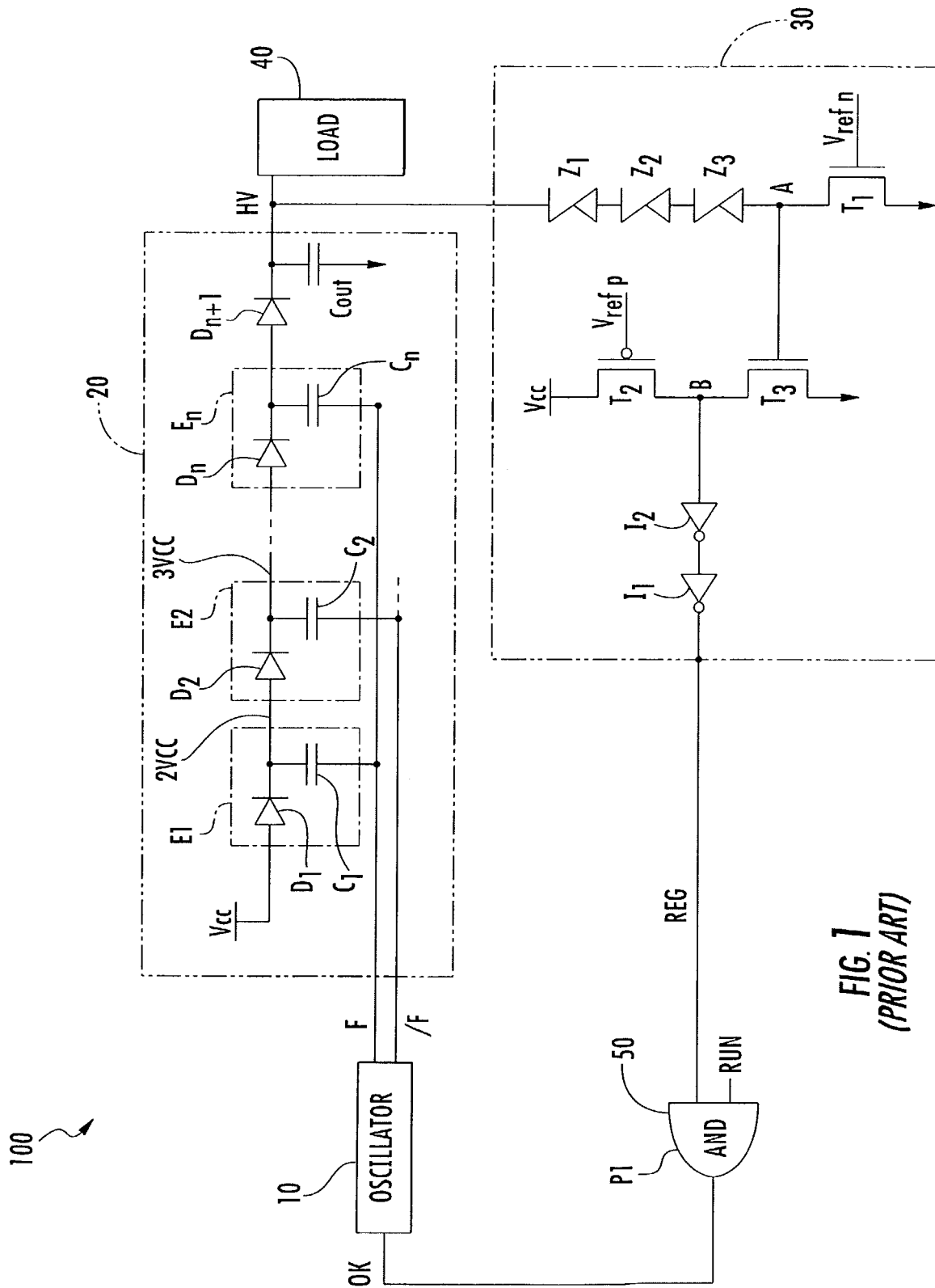
FIG. 1 is a block diagram of a high-voltage generator according to the prior art.
Figure 2:
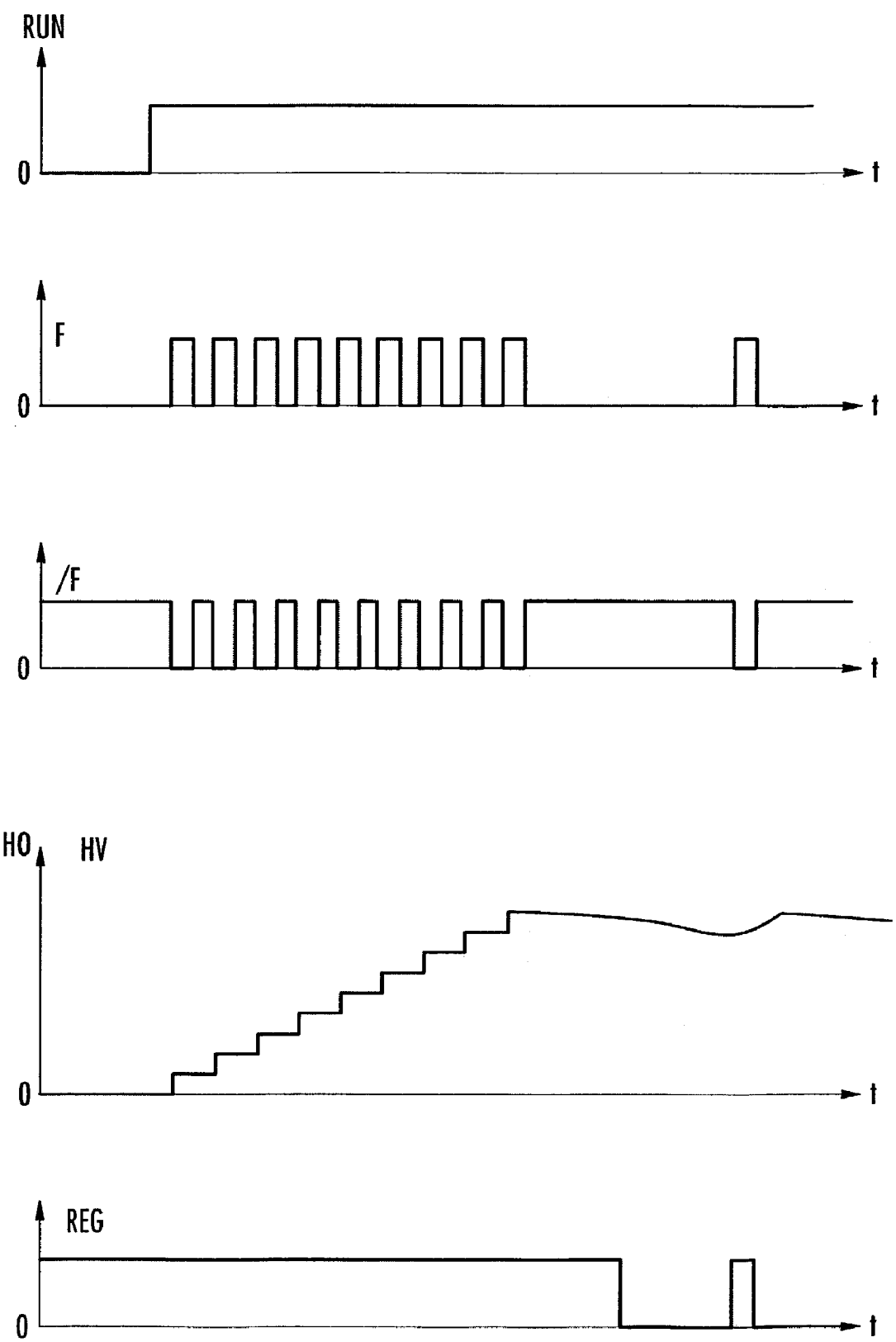
FIG. 2 illustrates timing diagrams of the progress of different signals present at certain characteristic points of the generator shown in FIG. 1.
Figure 4:
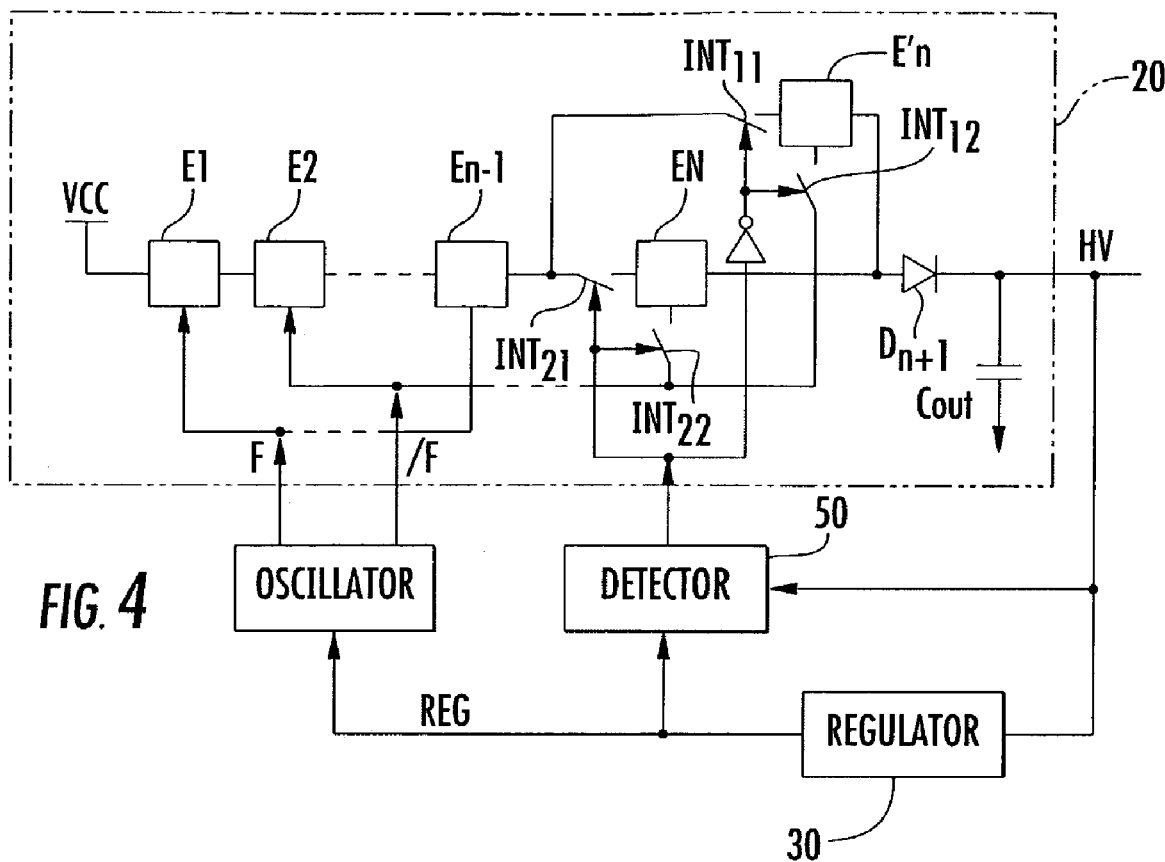
FIG. 4 is a block diagram of a high-voltage generator according to the present invention.

FIG. 4 shows a block diagram of a high-voltage generator according to the invention. As compared with a prior art generator such as that of FIG. 1, this generator has an added detector 50 and the charge pump 20 has been complemented by a replacement stage En', and means to replace the damaged stage En by the stage En' in the charge pump.

Like a prior art charge pump, a pump according to the invention comprises n stages E1 to En series-connected with a diode Dn+1 between a power supply terminal VCC and the output of the pump at which the high voltage HV is produced. A capacitor Cout is connected between the output of the diode Dn+1 and ground to smooth the voltage HV.

As a complement, a switch INT11 and the stage En' are series-connected between the voltage output of the stage En-1 and the anode of the diode Dn+1. A switch INT12 is inserted between the control terminal of the stage En' and the line distributing the driving signal of the stage En (signal F in FIG. 4). A switch INT21 is inserted between the voltage output of the stage En-1 and the voltage input of the stage En. Finally, a switch INT22 is inserted between the control terminal of the stage En and the line distributing the driving signal (signal F) of the stage En.

The stage En' is identical to the stage En. The stage En' comprises a diode and a capacitor and they both receive the same driving signal F or /F via a switch. In the example of FIG. 4, the driving signal is F. A signal RST is applied to a control input of the switches INT21, INT22 by an inverter I3. The signal RST is also applied to the control input of the switches INT11, INT12. In normal operation, the signal RST is inactive. The switches INT11, INT12 are closed and the switches INT21, INT22 are open so that the stage En is series-connected with the stages E1 to En-1. Inversely, when the signal RST is active, the switches INT11, INT12 are open and the switches INT21, INT22 are closed so that this time the stage En' is series-connected with the previous stages E1 to En-1.

The detector 50 receives the signal REG and/or the high voltage HV, and produces the active signal RST if it detects the fact that the charge pump is damaged. The high-voltage generator according to the invention works as follows. In normal operation, the switches INT11, INT12 are open, the switches INT21, INT22 are closed and the high-voltage generator works in the same way as a prior art generator of the kind shown in FIG. 1. If, on the contrary, the detector 50 detects an abnormal operation in the charge pump (the pump being damaged), then it produces an active signal RST causing the pump to be repaired. The switches INT11, INT12 are closed and the switches INT21, INT22 are opened. The damaged stage En is disconnected and the stage En' is connected instead. The charge pump immediately resumes normal operation.

The replacement of the damaged stage is done "on the fly." The replacement is done during the operation of the oscillator and of the pump. This enables a resumption of normal operation in the high-voltage generator without any need to stop it and start it again with a new and relatively lengthy starting phase. The repairing of the pump is thus totally transparent to the user.

The example of FIG. 4 considers a charge pump comprising a single replacement stage En', and means (switches INT11, INT12, INT21, INT22) to replace the last stage En of the pump. This makes it possible to repair the pump in 80 to 90% of the cases in which the pump is damaged. For greater security, it may be planned to have several replacement stages and means to replace several stages of the pump, as shall be seen more clearly below.

Detection of a defect in a charge pump will now be discussed. The signal RST is produced by the detector 50 when it detects that a stage of the pump (stage En in FIG. 4) is damaged, i.e., when a capacitor has broken down, leading to a gradual fall in the voltage HV.

A first embodiment of a time-related detection will now be discussed. A first way to detect the fact that the charge pump is damaged is to see whether the signal REG, and therefore the oscillator, are regularly deactivated/reactivated. To this end, the invention proposes to measure the time during which the signal REG is active, and to give a warning when this time exceeds a predefined value t1. The active signal RST is given to the charge pump, which replaces the damaged stage by a new stage and then resumes normal operation (FIG. 3e curve (b)).

As was shown in FIGS. 3a to 3d, especially in normal operation, after the high-voltage generator starting phase, the signal REG is regularly deactivated/reactivated. The signal REG is approximately periodic. The duration of its period and the duration t0 of the pulse of the signal REG depend on the variations of the voltage HV, i.e., they depend on the power supply voltage VCC and the current consumed by the load.

Figure 5:
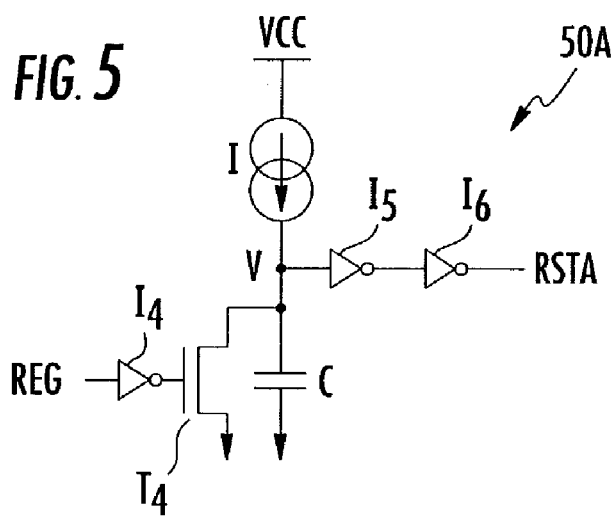
FIGS. 5 to 7 are detailed drawings of different embodiments of the high-voltage detector shown in FIG. 4.

FIG. 5 shows a first exemplary embodiment 50A of the detector 50 according to the invention, which can be used to detect that the signal REG is being regularly deactivated. If the signal REG is not deactivated at the end of a predefined period of time t1, the detector 50 produces a warning signal RSTA, indicating that the signal REG has been active far too long and therefore that the charge pump is damaged. The predefined time t1 is chosen to be greater than the duration t0 of a normal pulse of the signal REG. Given that t0 depends especially on the consumption of the load and is therefore variable, the value of t1 is chosen for example to be about ten times the mean duration of a pulse REG.

The detector 50A of FIG. 5 comprises a current source producing a current I. The voltage VCC is applied to one pole of the current source whose other pole is connected to a first terminal V of a capacitor C whose other terminal is connected to ground. The detector 50A also has an N-type transistor T4 whose drain and source are respectively connected to the two terminals of the capacitor C. At its gate, the transistor T4 receives the signal REG via an inverter I4.

Finally, the detector comprises two series-connected inverters. The input of the inverter I5 is connected to the common point of the current source and of the capacitor. The output of the inverter I6 forms the output of the detector at which the signal RSTA is produced. The inverter I5 has a switch-over threshold equal to V1. The inverter I6 simply has a function of compensating for the inversion introduced by the inverter I5. Thus, if the potential at the point V is lower than V1, the signal RSTA produced at output of the detector 50A is equal to a logic zero. If not, it is equal to a logic one.

As long as the signal REG is inactive (zero), the transistor T4 is on and the two terminals of the capacitor C are short-circuited. If it is charged, the capacitor is discharged to ground. Similarly, the current I produced by the source flows to ground and the point V is at a zero potential. When the signal REG is active, the transistor T4 is off. The current I charges the capacitor C and the potential V grows according to the relationship I=C(dV/dt), that is, V=(I/C)*t with t being time.

If the signal REG is deactivated before the time $t1=V1*(C/I)$, then the transistor T4 again comes on and the potential V is brought to zero. If the signal REG is not deactivated, then the inverter I4 switches over when the potential V reaches the value V1. The values of C, I and V1 are chosen as a function of the desired value of t1.

The detector 50A is thus equivalent to a time lag circuit, which is activated when the signal REG is activated and produces the signal RSTA if it is kept active during a period of time at least equal to t1. Since the signal REG is active for a long time only when the charge pump can no longer maintain the level HV0 at its output, the detector 50A makes it possible to indicate damage in the charge pump.

Figure 6:
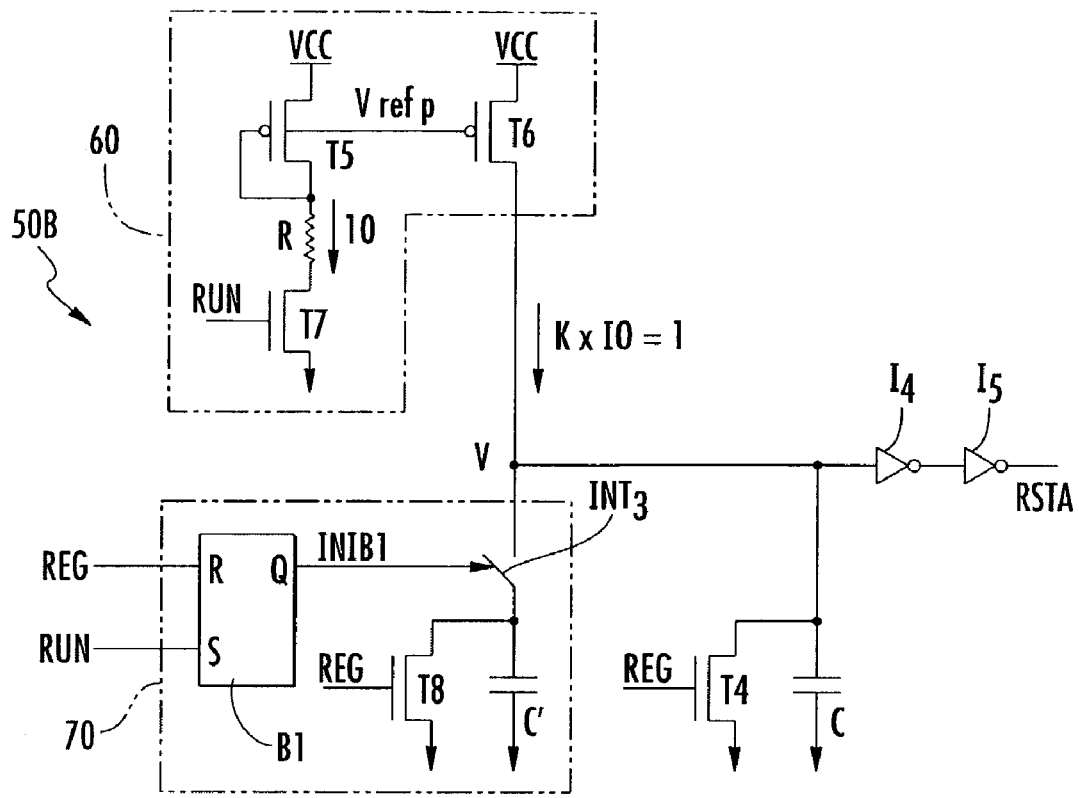

A second embodiment is temporal detection. FIG. 6 shows a second embodiment 50B of the detector 50, which is actually an improved version of the detector of FIG. 5. A first improvement of the detector of FIG. 6 includes using a current source 60 that is stable as a function of the power supply voltage VCC, and using a current mirror for this purpose.

The source 60 thus has two P-type transistors T5, T6, one N-type transistor T7, and one resistor R. The resistor R has a first terminal connected to the source of the transistor T5 and a second terminal connected to the drain of the transistor T7. The gate of transistor T5 is connected to its drain. The source of transistor T7 is grounded and the starting signal RUN is applied to the source of transistor T7. The reference voltage VREFP is applied to the gates of the transistors T5, T6. VREFP is chosen so that transistors T5, T6 are always on. The drain of transistor T6 is connected to the point V, which is the common point of the capacitor C and of the inverter I4. The voltage VCC is applied to the sources of the transistors T5, T6. The current flowing in the resistor R is I0. I0 is equal to (VCC−VTP)/R, with VTP being the conduction threshold of the transistor T5. The current I flowing in the transistor T6 is equal to K.I0, with K being the W/L ratio of the transistors T5, T6.

It is possible for example to choose an inverter I4 having a switch-over threshold V1 equal to VCC−VTP. For this, it is enough to choose an inverter having a PMOS transistor and an NMOS transistor series-connected between the voltage source VCC and ground, and such that the W/L of the PMOS transistor is far greater than the W/L of the NMOS transistor. The following is obtained in this case:

$$t1=V1*C/I=(VCC-VTP)*C/[(VCC-VTP)*K/R],$$ that is, $t1=RC/K$, and $t1$ is therefore independent of the voltage $VCC$.

It must be noted that the sole function of the transistor T7 is to block operation of the current source when the high-voltage generator is at a stop (RUN inactive) to avoid any unnecessary consumption of energy. The transistor T7 can be eliminated.

A second improvement of the detector of FIG. 5 is used to take account of the fact that, when the high-voltage generator is started, the signal REG remains active throughout the starting phase which may be relatively lengthy, although the charge pump is not damaged. Time t2 denotes the average duration of the starting phase, equal to the duration of the first pulse of the signal REG. For this purpose, the invention adds on a circuit 70, which lengthens the duration of the time lag of the detector during the monitoring of the first pulse of the signal REG, corresponding to the starting phase of the high-voltage generator.

In the example of FIG. 6, the circuit 70 comprises a switch INT3 controlled by a signal INIB1, the capacitor C', an N-type transistor T8 and an RS type flip-flop circuit B1. A first terminal at the switch INT3 is connected to the common point of the inverter I4 and of the capacitor C (point V) and a second terminal of the switch INT3 is connected to a terminal of the capacitor C' whose other terminal is grounded. The drain of transistor T8 is connected to the common point of the capacitor C' and of the switch INT3 and its source is grounded. The signal REG is applied to the control gate of transistor T8. The flip-flop circuit B1 receives the signal REG and the signal RUN at two inputs and produces the signal INIB1 applied to a control input of INT3.

At the first pulse REG, the flip-flop circuit B1 imposes an active signal INIB1 which closes the switch INT3, so that the capacitor C' is parallel-connected to the capacitor C. The current source must then produce the current I during a time $t3=V1(C+C')/I$ or $t3=R(C+C')/K$, before the inverter I4 switches over.

Given that t2, the duration of the starting phase depends especially on the consumption of the load, and a period of time t3 is chosen for example to be equal to ten times the mean duration of t2. After the value of C has been chosen as a function of the time t1 chosen, the value of C' is chosen as a function of the time t3 chosen.

After the end of the first pulse of the signal REG, the flip-flop circuit B1 deactivates the signal INIB1 and the switch INT3 so that the capacitor C' is electrically insulated from the capacitor C. The detector 50B of FIG. 6 is then equivalent to the detector of FIG. 5 and produces the signal RSTA if REG is kept active beyond the time t1.

A third embodiment of the detector 50 is level detection. A second way of detecting the fact that a charge pump is damaged is to see whether the voltage HV produced is still maintained above a critical threshold HVC. To this end, the invention proposes to measure the level of the voltage HV and provide a warning when this level falls below the desired critical value HVC.

Figure 7:
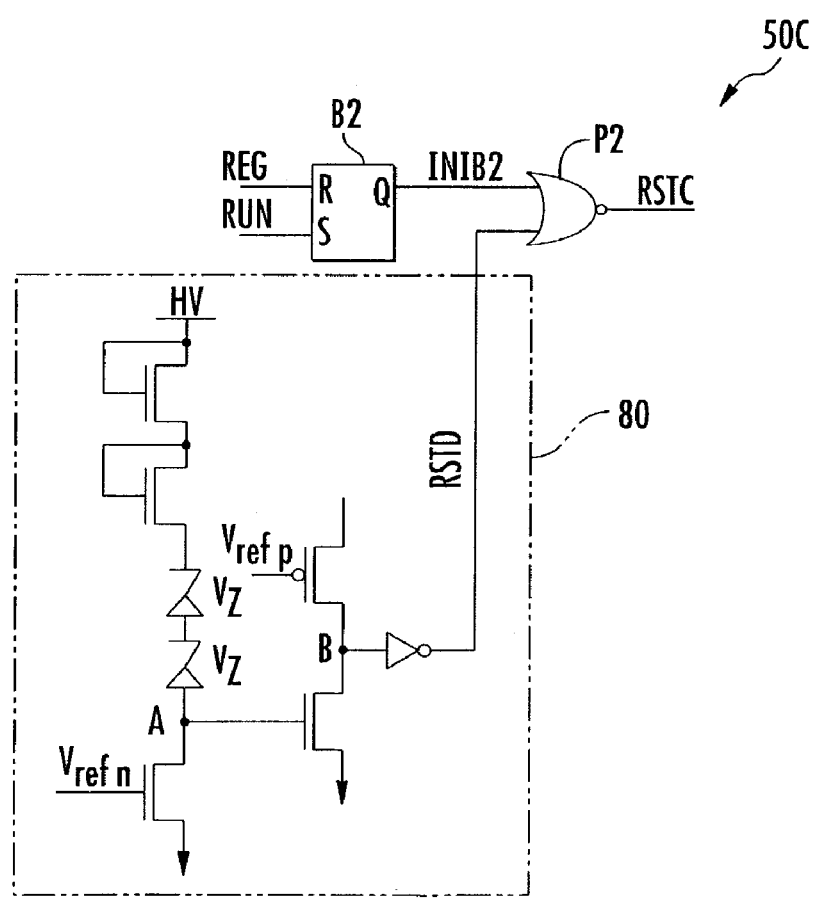

FIG. 7 shows a third exemplary embodiment 50C of a detector according to the invention, which can be used to find out if the voltage HV falls below the value HVC. If the voltage HV falls below HVC, the detector 50C produces a warning signal RSTC, indicating that the voltage HV has dropped below the critical value and hence that the charge pump is damaged. For example, HVC can be chosen to be in the range of 12.5V for a nominal value HV0 in the range of 17V.

The detector 50C comprises a voltage level detector 80, a flip-flop circuit B2 and a logic gate P2. The detector 80 is similar to the regulator 30 used to regulate the voltage HV at its nominal value HV0. Simply, a slightly different stack of diodes is chosen so as to have a detection threshold (equal to the drop in voltage between the two terminals of the stack of diodes) equal to HVC, lower than detection threshold of the regulator 30.

In the example of FIG. 7, the elements chosen are a stack of diodes comprising two Zener diodes with a threshold in the range of 5.3V, and two simple diodes (each formed by a transistor whose gate is connected to the drain) with a detection threshold of about 1V. Thus, a detection threshold in the range of $2*5,3+2*1=12.6V$ is obtained. The detector 80 receives the voltage HV and produces an active signal RSTD if the voltage HV falls below HVC.

The flip-flop circuit B2 is an RS type flip-flop circuit. It receives the signal RUN for starting the high-voltage generator and the oscillator activation signal REG. The flip-flop circuit B2 produces a signal INIB2 that is active during the first active pulse of the signal REG (i.e., during the high-voltage generator starting phase), and becomes inactive at the very first deactivation of the signal REG (which corresponds to the end of the starting phase). The signal INIB2 produced by the flip-flop circuit B2 and the signal RSTD produced by the detector 80 are applied to two inputs of the gate P2 which produces the signal RSTC. If the signal INIB2 is active, RSTC is still inactive. If the signal INIB2 is inactive, RSTC is equal to the signal RSTD. RSTC is active if HV<HVC, and RSTC is inactive if HV>HVC.

The flip-flop circuit B2 thus has the effect of neutralizing the signal RSTD during the starting phase (INIB2 active) during which the voltage HV, initially at zero, is necessarily lower than HVC during a part of the starting phase, even though the charge pump is damaged. The signal RSTC is applied to the charge pump, which replaces the damaged stage and then resumes normal operation (see FIG. 3e, curve (c)).

A fourth embodiment of the detector is a combined function. The time-based detection is efficient if the voltage HV does not drop far too rapidly when the pump is damaged, i.e., if the load of the high-voltage generator consumes current that is not too low. If the load consumes excessively large current, then the voltage HV drops rapidly and reaches a particularly low value before the time-based detector reports that the charge pump is damaged. Now, a particularly low value of the voltage HV may be detrimental to the load. For example, if the voltage HV is used to program a memory, the programming is not guaranteed if HV is below a critical value.

The level detection is efficient if the voltage HV does not drop too slowly when the pump is damaged, i.e., if the current consumed by the load of the high-voltage generator is not too low. If the current consumed by the load is too low, then a relatively lengthy period of time elapses before the level detector reports that the voltage HV has fallen below its critical level and that the pump is damaged. Now, a value of HV below its nominal value HV0 during an excessively lengthy period of time may be detrimental to the load.

To overcome the drawbacks of the time-based detector and those of the level detector, the invention proposes to combine the two modes of detection. To this end, a fourth embodiment (not shown) of a detector according to the invention uses a time-based detector according to FIG. 5 or FIG. 6 and a level detector according to FIG. 7.

The signals RSTA, RSTC produced by the two detectors are combined by an OR gate to produce a signal RST which is active if the signal RSTA or the signal RSTC is active. Thus, the signal RST is active if the signal REG is active for an excessively lengthy time or if the voltage HV is below the critical value. The signal RST thus produced is applied to the charge pump. This leads to the immediate repairing of the pump when it is active.

Repairing the charge pump will now be discussed. As discussed above in the context of the description of FIG. 4, after the detector 50 has reported that the charge pump is damaged, the process of repairing the charge pump comprises a step for the disconnection of the damaged stage, followed by a step for the connection of a replacement stage. It may be complemented by a step for the storage of information indicating that the pump has been repaired.

The defects usually affect only the last stages of the pump which are subjected to the highest voltages. It is therefore unnecessary to provide for the possibility of repairing the first stages of the pump. However, it will be worthwhile to provide for the possibility of repairing several stages of the pump since, in 10 to 20 percent of the cases, if it is a stage other than the last stages that breaks down, for example, one of the three or four last stages.

To this end, a pump (not shown) comprising x replacement stages and means (a set of appropriate switches) are used to replace the x last stages of the pump. The number of replacement stages used is, of course, a compromise between the desire to repair the pump in the greatest number of cases, ideally 100%, and the size of the pump including the replacement stages, given that a stage of the pump is fairly bulky.

When the detector reports that the pump is defective, it is possible to envisage at least two repair processes. In a first process, the x last stages of the pump are repaired at the same time, regardless of which one is damaged. In this case, the invention provides for a pump with means to simultaneously replace the x stages. Two switches are enough for this purpose, one connected between the n-x-1 ranking stage and the n-x ranking stage, or between the n ranking stage and the diode Dn+1. The other switch is series-connected with the x replacement stages. The series is connected between the n-x-1 ranking stage and the n-x ranking stage, and on the other hand, between the k ranking stage and the diode Dn+1.

In a second process, the following steps are performed: replacing the last stage of the pump; monitoring operation of the pump; if the pump again operates normally (with the signal RST inactive), the repairing is terminated; and if the pump does not work normally (the signal RST is still active), then the second-last stage is replaced. The steps are reiterated as many times as is necessary, until the pump is repaired. Naturally, to implement this process, the invention will use a charge pump comprising means to individually replace each of the x last stages.

That which is claimed is:

1. A generator for producing a high voltage from a power supply voltage comprising:
   an oscillator for producing a driving signal;
   a charge pump for producing the high voltage from the power supply voltage as a function of the driving signal, said charge pump comprising
      n series-connected voltage step-up stages including a first step-up stage receiving the power supply voltage and a last step-up stage producing the high voltage, with n being greater than 1,
      at least one replacement step-up stage; and
      a switching circuit for replacing a damaged one of said n series-connected voltage step-up stages with said at least one replacement stage when a warning signal is received;
   a voltage regulator for producing an activation signal for activating said oscillator if the high voltage is below a desired value; and
   a detector for producing the warning signal if said charge pump is defective.

2. A generator according to claim 1, wherein said detector produces the warning signal when the activation signal is kept active by said regulator during a period of time greater than a predefined time.

3. A generator according to claim 2, wherein said detector comprises:
   a first charge accumulator for receiving a charging current;
   a comparator for producing the warning signal when a potential at said first charge accumulator reaches a predefined value; and
   a selectable circuit path for short-circuiting said first charge accumulator when the activation signal is inactive.

4. A generator according to claim 3, wherein the charging current is independent of the power supply voltage.

5. A generator according to claim 2, wherein said detector further comprises a delay circuit for extending duration of the predefined time during a pump-starting phase of said charge pump.

6. A generator according to claim 1, wherein said detector produces the warning signal when the high voltage falls below a critical value.

7. A generator according to claim 6, wherein said detector comprises:
   a voltage level detector for producing the warning signal when the high voltage is below the critical value;
   an inhibit circuit for inhibiting said voltage level detector during a first activation of the activation signal.

8. A generator according to claim 1, wherein said detector produces the warning signal when the activation signal is kept active during a period of time greater than a predefined time, or when the high voltage falls below a critical value.

9. A high-voltage generator comprising:
   an oscillator for producing a driving signal;
   a charge pump for producing a high voltage from a power supply voltage based upon receiving the driving signal, said charge pump comprising
      a plurality of voltage step-up stages connected in series, said plurality of voltage step-up stages including a first step-up stage receiving the power supply voltage and a last step-up stage producing the high voltage,
      at least one replacement step-up stage; and
      at least one switch for replacing a damaged one of said plurality of voltage step-up stages with said at least one replacement stage when a warning signal is received;
   a voltage regulator for producing an activation signal for activating said oscillator if the high voltage is below a desired value; and
   a detector for producing the warning signal if one of said plurality of step-up stages is defective.

10. A high-voltage generator according to claim 9, wherein said detector produces the warning signal when the activation signal is kept active by said regulator during a period of time greater than a predefined time.

11. A high-voltage generator according to claim 10, wherein said detector comprises:
   a first charge accumulator for receiving a charging current;
   a comparator for producing the warning signal when a potential at said first charge accumulator reaches a predefined value; and
   a selectable circuit path for short-circuiting said first charge accumulator when the activation signal is inactive.

12. A high-voltage generator according to claim 11, wherein the charging current is independent of the power supply voltage.

13. A high-voltage generator according to claim 10, wherein said detector further comprises a delay circuit for extending duration of the predefined time during a pump-starting phase of said charge pump.

14. A high-voltage generator according to claim 9, wherein said detector produces the warning signal when the high voltage falls below a critical value.

15. A high-voltage generator according to claim 14, wherein said detector comprises:
   a voltage level detector for producing the warning signal when the high voltage is below the critical value;
   an inhibit circuit for inhibiting said voltage level detector during a first activation of the activation signal.

16. A high-voltage generator according to claim 9, wherein said detector produces the warning signal when the activation signal is kept active during a period of time greater than a predefined time, or when the high voltage falls below a critical value.

17. A method for repairing a high-voltage generator comprising an oscillator for producing a driving signal; a charge pump for producing a high voltage from a power supply voltage based upon receiving the driving signal, the charge pump comprising a plurality of series-connected voltage step-up stages including a first step-up stage receiving the power supply voltage and a last step-up stage producing the high voltage, at least one replacement step-up stage, and a switching circuit for replacing a damaged one of the plurality of series-connected voltage step-up stages with the at least one replacement stage when a warning signal is received; a voltage regulator for producing an activation signal for activating the oscillator if the high voltage is below a desired value; and a detector for producing the warning signal when a defective state of the charge pump has been detected, the method comprising:

monitoring the charge pump;

determining if the charge pump is defective based upon the detector generating the warning signal; and activating the switching circuit based upon receiving the warning signal for replacing a damaged one of the plurality of series-connected voltage step-up stages with the at least one replacement step-up stage.

18. A method according to claim 17, wherein replacing the damaged one of the plurality of series-connected voltage step-up stages comprises:

disconnecting the damaged step-up stage in the charge pump;

connecting the at least one replacement step-up stage in place of the damaged step-up stage; and storing information that the charge pump has been repaired.

19. A method according to claim 17, wherein the last step-up stage of the charge pump is replaced by the at least one replacement step-up stage.

20. A method according to claim 17, wherein the at least one replacement step-up stage comprises a plurality of step-up stages, wherein more than one step-up stages are defective, and the defective step-up stages are replaced by an equivalent number of replacement step-up stages.

21. A method according to claim 17, wherein after a defective step-up stage has been replaced, further comprising:

monitoring the charge pump again;

determining if the charge pump is defective based upon the detector generating the warning signal; and activating the switching circuit based upon receiving the warning signal for replacing a step-up stage ranked immediately below a previously replaced step-up stage.

* * * * *

UNITED STATES PATENT AND TRADEMARK OFFICE
CERTIFICATE OF CORRECTION

PATENT NO. : 7,239,192 B2 Page 1 of 1
APPLICATION NO. : 10/911409
DATED : July 3, 2007
INVENTOR(S) : Tailliet It is certified that error appears in the above-identified patent and that said Letters Patent is hereby corrected as shown below:

On Title Page
Title page (73)   Delete: "Montrogue"
                  Insert: -- Montrouge --

Signed and Sealed this

Twenty Second Day of April, 2008

JON W. DUDAS
*Director of the United States Patent and Trademark Office*